May 11, 1937.  E. C. GREGORY  2,080,042
CREAM SEPARATOR
Filed March 31, 1936
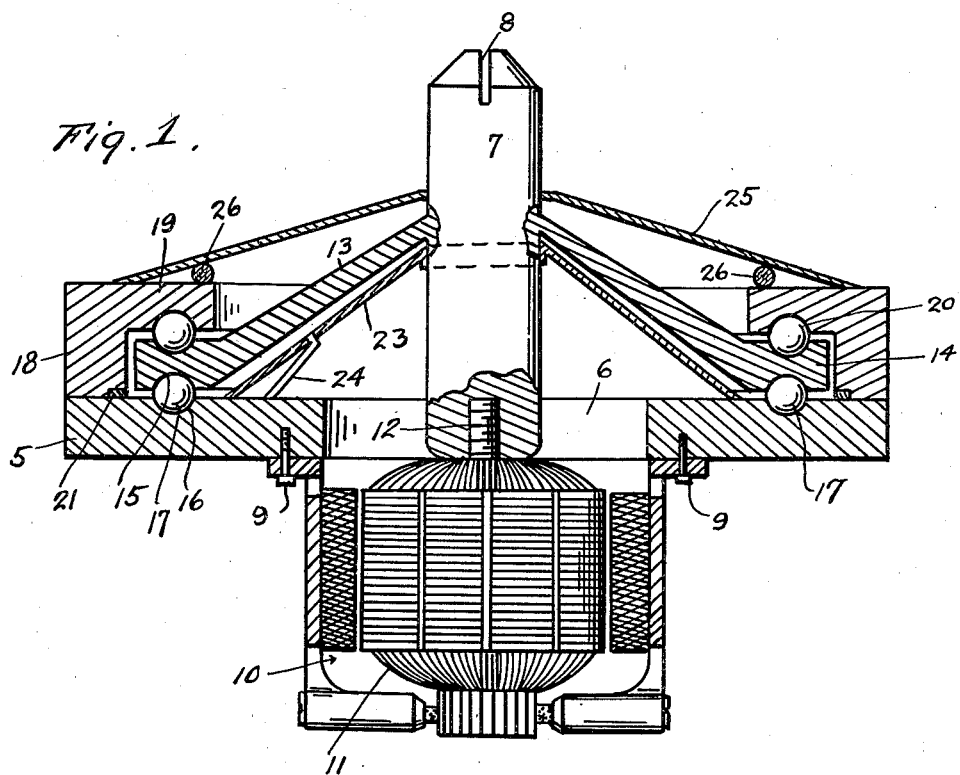
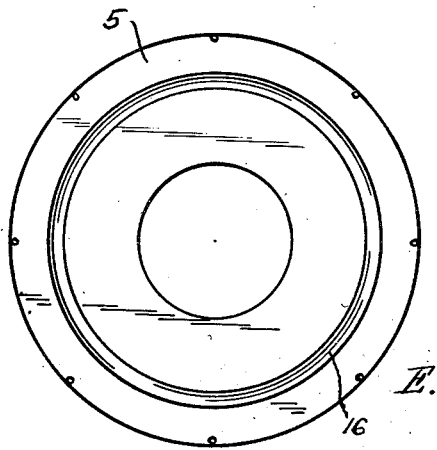
Inventor
*E. C. Gregory*
By *Clarence A. O'Brien* and *Hyman Berman*
Attorneys Patented May 11, 1937

2,080,042

UNITED STATES PATENT OFFICE 2,080,042

CREAM SEPARATOR

Edwin C. Gregory, New Harmony, Ind.

Application March 31, 1936, Serial No. 71,980

1 Claim. (Cl. 308—148)

This invention relates broadly to cream separators and more particularly to an improved mechanism for revolving or rotating the bowl of a cream separator of the centrifugal type.

More particularly the invention consists in the provision of an improved electric motor drive assembly for use with centrifugal bowl separators; an object of the invention being also to provide improved provision for lubricating the rotating parts.

The invention together with its objects and advantages will be best understood from a study of the following description taken in connection with the accompanying drawing wherein:

Figure 1 is a view mostly in vertical section through a bowl drive assembly embodying the features of the present invention.

Figure 2 is a plan view of a plate member forming part of the invention.

Referring to the drawing more in detail it will be seen that in accordance with the preferred embodiment thereof the invention comprises a circular plate or disk 5 having a central opening 6 therethrough to accommodate a driven spindle 7 the upper end of which is provided at 8 for the connecting of the base of the bowl of a cream separator thereto for revolving said bowl.

Secured to the under side of the plate 5 in axial alinement with the opening 6 and as indicated generally at 9 is a substantially cylindrical frame structure 10 suitably provided to accommodate and having suitably arranged therein a conventional electric motor of the type shown and indicated generally by the reference numeral 11.

Further in accordance with the present invention the rotating armature of the motor 11 has a threaded pin part 12 which is screwed into the lower end of the spindle 7 whereby to provide a positive drive connection between the electric motor and the spindle.

The spindle 7 extends axially through a conical member 13 which at its apex is secured to the spindle 7 in any suitable manner preferably by being integral therewith.

At its lower edge the member 13 is flanged as at 14 and the under face of the flange is grooved as at 15 and in a manner complemental to the groove 16 in the top face of the plate 5 to accommodate anti-friction elements 17 in the form of ball bearings or the like, said member 13 serving to balance the bowl connected to the spindle 7.

Also secured to the plate 5 by bolts or in any other suitable manner adjacent the peripheral edge of the plate is an annular member 18 having at its upper edge an inturned flange 19 that overlies the flange 14 of the member 13. In its under side flange 19 is grooved complemental to a groove in the top side of flange 14 to accommodate anti-friction elements in the form of ball bearings 20.

At its lower edge and adjacent its inner side the flange 18 is provided with a notch in which is suitably fixed a gasket 21, the plate 5 and member 18 thus forming a lubricant chamber adapted to receive oil to a suitable depth for maintaining the rotating parts in a bath of lubricant at all times.

To prevent any of the oil gaining access to the electric motor there is provided a substantially conical oil shield 23 which is disposed with its apex upward and which at its apex is apertured to permit the spindle 7 to extend therethrough. In this connection it will be noted that the shield 23 is so disposed relative to the opening 6 as to prevent oil getting to the motor.

Extending from the shield 23 and through a suitable opening in the plate 5 is an overflow pipe 24.

Also to prevent splashing of the oil there is provided a top oil shield 25 which is also substantially conical and which at its apex is apertured to accommodate the stem 7 while at its largest end the edges of the shield 25 rest on the member 18 as clearly shown.

Between the flange 19 and an adjacent portion of the shield 25 there is suitably interposed and retained in any suitable manner a gasket 26. It will thus be seen that the oil will be confined between the shields 23 and 25 and in this way the member may be maintained in a bath of oil.

It is to be understood that this device may be used with any type of bowl forming part of the cream separator and that the device may be also used with any suitable support provided for the separator and will be found especially useful for centrifugal cream separators of the hand type adapted to be supported on a table or similar supporting structure.

Having thus described the invention, what is claimed as new is:

A driving assembly for separator bowls comprising a substantially circular lubricant retaining chamber and having a peripheral wall formed with an internal groove a spindle extending centrally through said chamber and having intermediate its ends a conical formation terminating at its largest diameter in a flange spaced outwardly from the spindle and working within said groove, anti-friction means interposed between said flange and the top and bottom walls respectively of said groove, a motor support secured to the bottom of said chamber, said chamber at the bottom thereof having an opening to accommodate one end of said spindle, said spindle at the opposite end thereof being provided for the attachment of the bowl of the separator thereto, a motor mounted in said motor support and positively connected with said spindle for revolving the latter, a substantially conical shield disposed within said chamber over said opening and between the bottom of said chamber and the aforementioned conical formation, and a second conical shield disposed over the top of the chamber, and each of said conical shields having an opening in the apex thereof to accommodate said spindle.

EDWIN C. GREGORY.